W. C. L. LEFELDT & C. G. O. LENTSCH.
CENTRIFUGAL MACHINE FOR CREAMING MILK.

No. 195,515. Patented Sept. 25, 1877.

UNITED STATES PATENT OFFICE.

WILHELM C. L. LEFELDT AND CARL G. O. LENTSCH, OF SCHOENINGEN, GERMANY.

IMPROVEMENT IN CENTRIFUGAL MACHINES FOR CREAMING MILK.

Specification forming part of Letters Patent No. 195,515, dated September 25, 1877; application filed August 3, 1877.

*To all whom it may concern:*

Figure 1:
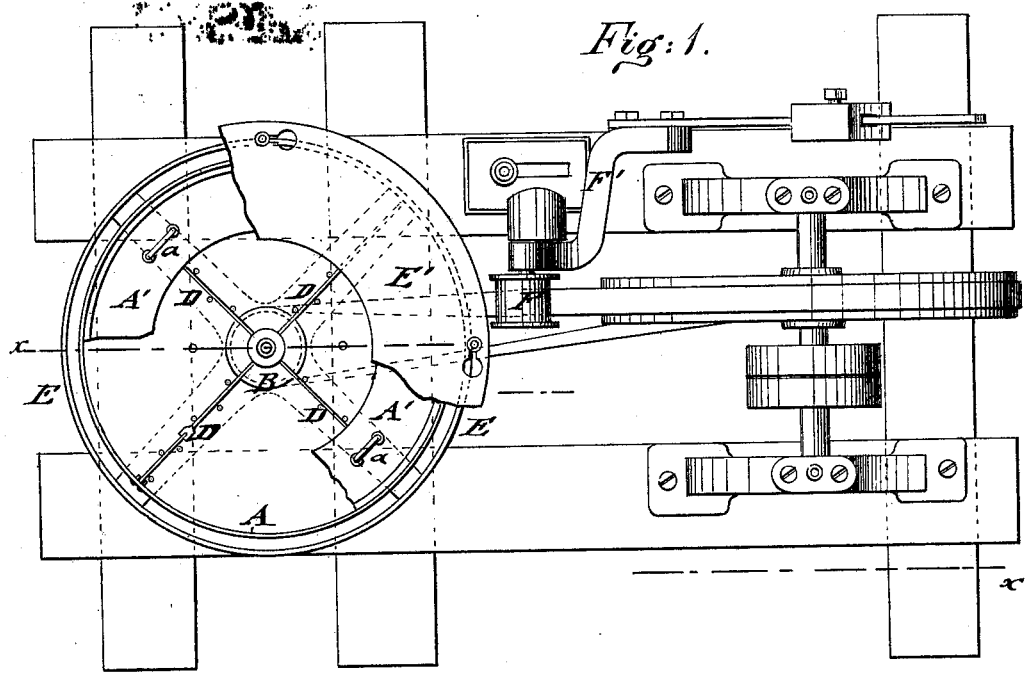
Figure 2:
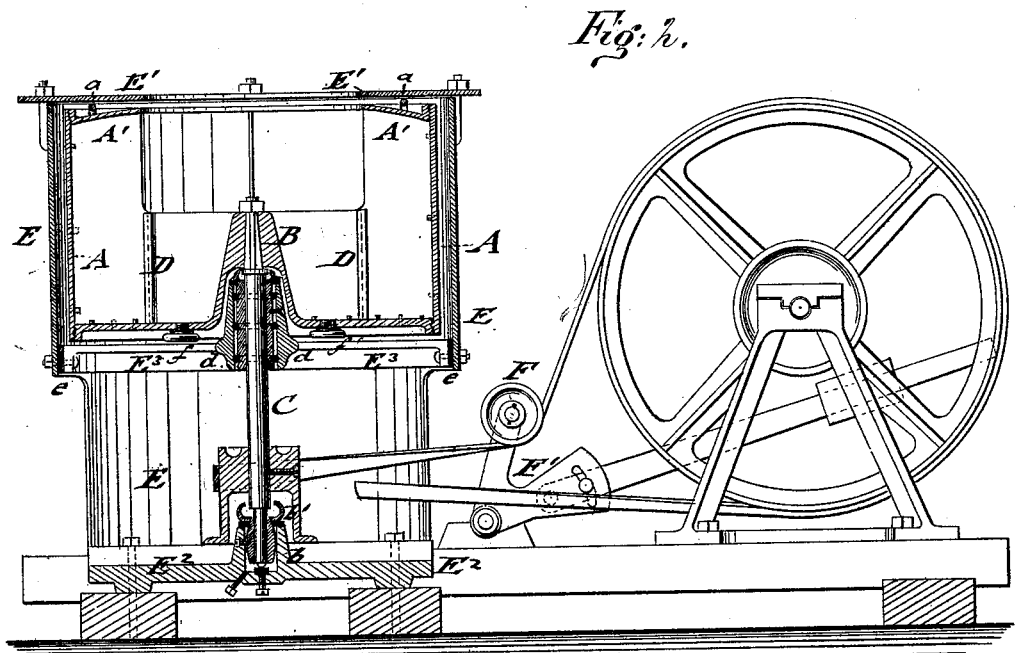

Be it known that we, WILHELM C. L. LEFELDT and CARL G. O. LENTSCH, of Schoeningen, Duchy of Brunswick and Empire of Germany, have invented a new and Improved Centrifugal Machine for Creaming Milk, of which the following is a specification:

In the accompanying drawings, Figure 1 represents a plan view of our improved centrifugal machine or apparatus for creaming milk, with parts broken off; and Fig. 2 is a vertical longitudinal section of the same on line $x\,x$, Fig. 1.

Similar letters of reference indicate corresponding parts.

Repeated attempts have been made with a view to separating the cream from milk in its fresh state in a simple and rapid manner, and a variety of different appliances have been constructed for this purpose, among them those in which centrifugal force has been employed. These attempts either entirely failed or gave unsatisfactory results, so that they were abandoned. After long and careful trials we have succeeded in constructing an improved machine or apparatus, in which the cream and milk are quickly and effectively separated by centrifugal force, the cream yielding a superior quality and larger quantity of butter. The successful working of the machine may be ascribed to the fact that the milk to be creamed is not exposed to any jerky or vibratory motion, the keeping of the tension of the driving-belt uniform, and the gradually starting and stopping of the machine. The whole apparatus may also be readily and easily cleaned, and is at the same time so constructed as to preclude accidents arising from the great speed in centrifugal machines.

The invention consists of a revolving cylinder or drum, provided with a fixed or detachable top flange or ring and with radial detachable partitions. The drum is inclosed by a guard casing or jacket, and revolved at uniform speed, being slowly started and stopped by means of a weighted idler bearing on the driving-belt. The spindle revolves in a cushioned bearing of radial arms of the safety-jacket and in a base-step. The cream is separated from the milk by centrifugal force, and drawn off after the drum has been slowly brought to rest by taking off the idler from the driving-belt.

In the drawings, A represents a cylinder or drum, of suitable material, which is poised by a central conical bearer, B, on the upper end of a vertical spindle, C. The conical bearer B is made in one piece with the bottom of the drum, or riveted to the same, and connected with the driving-lugs of the spindle, so as to be revolved thereby. The drum A is made, in contradistinction to the perforated drums in centrifugal machines, without any exit-holes, and open at the top, but provided with an inwardly-extending level or inclined guard flange or ring, A', that is either permanently attached to the drum or preferably screwed into the upper part of the same, to be taken hold of by handles $a$, which facilitate the detaching and inserting of the guard-flange. The flange, however, has to be screwed into the drum in a direction opposite to the direction of motion of the same, so that any possibility of loosening and detaching of the guard-flange is prevented, the flange so screwed in having a tendency to be seated tighter in the drum by the rapid motion of the same, so as to form a water-tight joint therewith.

The drum A is divided by radial partitions D into a number of sections, according to the size of the drum. The partitions D are secured either in grooves of the side, bottom, and bearer of the drum, or held by retaining-pins, as shown in the drawing, or in other manner, so as to be readily removed for cleaning and reinserted. The partitions extend up to the guard-flange, but are, near the center only, made about the height of the bearer B, and preferably fastened by the washer and nut, by which the bearer is attached to the spindle. The partitions may be made of one piece or of two sections, connected by groove-and-tongue joint, as found most convenient. The drum A is inclosed by a cylindrical safety casing or jacket, E, with a removable top flange or cover, $E^1$, for the prevention of that class of accidents to which centrifugal machines are liable.

The cover E¹ is secured by screw-bolts passing through slots of the same and fastening-nuts.

The casing or jacket E is firmly secured, by a cast-iron base-plate, E², to the bed-frame of the machine, and broken out at diametrically opposite sides for the driving-belt.

The spindle C is supported on a step, $b$, of the base-plate, and, by a bearing or sleeve, $d$, on radial arms E³, that are screwed to the jacket a small distance below the drum, the arms or braces being cushioned, to take up the vibrations of the spindle, by rubber plates $e$ interposed between the ends of the arms and the jacket.

The step $b$ is provided with a brass bearing, $b'$, having outer concaved sides, that provide for the oscillations of the spindle, and with a cushioning-gasket and oil-cup, also with an interchangeable step-plate, and a plug for drawing off the spent oil, as shown in Fig. 2.

The upper bearing of the spindle is provided with a journal-box, cushioned against the oscillations of the spindle by a number of interposed rubber rings, the journal-box being secured to the beam or sleeve $d$ by a suitable set-screw.

The spindle C is provided with a belt-pulley, over which the driving-belt passes, the same being set in motion by the fly-wheel of the driving-shaft of any suitable motor. An idler, F, at the end of an elbow-lever, F', which is pivoted to an adjustable plate of the bed-frame, regulates the tension of the driving-belt.

The extended arm of the elbow-lever is provided with an adjustable weight, by which the tension may be made greater or less, or entirely discontinued.

A registering appliance, for counting the number of revolutions of the drum, may be arranged in any suitable manner in connection with the vertical spindle.

The apparatus is operated as follows: The milk is placed, in fresh state, in the drum, and the drum then gradually set in motion by pressing the idler first lightly against the driving-belt until the maximum velocity is obtained. The milk is allowed to revolve with the drum for about twenty minutes, during which time the separation of the cream from the blue milk is obtained by the greater specific gravity of the latter, which is thrown up along the wall and against the top flange, while the lighter cream collects nearer to the center. The success of the operation depends now on the stopping of the machine in such a manner that this separation of the milk and cream is kept up, so that they may be separately drawn off. This is accomplished by stopping the drum slowly without jerks, which is obtained by raising the weighted arm of the elbow-lever, so that the idler clears the belt and takes off the tension of the same. This causes the revolving the drum and spindle by their own *vis viva*, and the gradual decrease of the speed of the same until they assume a state of rest. After a few minutes of rest the cream may be skimmed off, the partition-walls being first carefully taken out for facilitating the taking out of the cream. The remaining milk is drawn off either by means of a siphon or through bottom apertures of the drum, which are closed by screw-plugs $f$. The water for cleaning the drum is also drawn off through these apertures, which, together with the removable partitions, admit the convenient and thorough cleaning of the apparatus, which is of great importance in such machines.

Having thus fully described our invention, we claim as new and desire to secure by Letters Patent—

1. A centrifugal machine for creaming milk, consisting of a revolving cylinder or drum, with solid bottom and sides and top ring or flange, and of a surrounding safety-jacket or casing, substantially in the manner described, and for the purpose specified.

2. In a centrifugal machine for creaming milk, a revolving cylinder or drum, made of solid bottom and sides and with a top ring or flange, in combination with radial partitions, substantially in the manner described, and for the purpose specified.

3. The combination of the cylinder or drum, having conical center-bearer, solid bottom and sides, and top wing or flange, with detachable radial partitions, which are near the center of the height of the bearer, while the parts nearer the circumference of the drum are extended to the top flange, substantially as specified.

4. The combination of the revolving drum and driving-spindle with a surrounding safety-jacket, having cushioned arms with center-bearing, and a base-plate with supporting base-step, substantially as described.

W. C. L. LEFELDT. [L. S.]
C. G. O. LENTSCH. [L. S.]

In presence of—
WILLIAMS C. FOX,
JOHS. KRACKE.